US011562489B2

(12) United States Patent
Ramani et al.

(10) Patent No.: US 11,562,489 B2
(45) Date of Patent: Jan. 24, 2023

(54) PIXEL-WISE HAND SEGMENTATION OF MULTI-MODAL HAND ACTIVITY VIDEO DATASET

(71) Applicant: Purdue Research Foundation, West Lafayette, IN (US)

(72) Inventors: Karthik Ramani, West Lafayette, IN (US); Sangpil Kim, Champaign, IL (US); Hyung-gun Chi, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 205 days.

(21) Appl. No.: 17/109,193

(22) Filed: Dec. 2, 2020

(65) Prior Publication Data

US 2021/0166393 A1    Jun. 3, 2021

Related U.S. Application Data

(60) Provisional application No. 62/942,591, filed on Dec. 2, 2019.

(51) Int. Cl.
*G06K 9/00*   (2022.01)
*G06T 7/11*   (2017.01)
(Continued)

(52) U.S. Cl.
CPC .............. *G06T 7/11* (2017.01); *G06K 9/6256* (2013.01); *G06K 9/6279* (2013.01); *G06T 7/136* (2017.01);
(Continued)

(58) Field of Classification Search
CPC ....................................................... G06T 7/11
See application file for complete search history.

(56) References Cited

U.S. PATENT DOCUMENTS

2011/0243409 A1\* 10/2011 Naimi ....................... G06T 7/11
382/128
2012/0068917 A1\* 3/2012 Huang .................... G06F 3/017
345/156

(Continued)

OTHER PUBLICATIONS

Fu, J., Liu, J., Wang, Y., Lu, H.: Stacked deconvolutional network for semantic segmentation. arXiv:1708.04943 (2017).
(Continued)

*Primary Examiner* — Hadi Akhavannik
(74) *Attorney, Agent, or Firm* — Maginot, Moore & Beck LLP

(57) ABSTRACT

A method for generating a multi-modal video dataset with pixel-wise hand segmentation is disclosed. To address the challenges of conventional dataset creation, the method advantageously utilizes multi-modal image data that includes thermal images of the hands, which enables efficient pixel-wise hand segmentation of the image data. By using the thermal images, the method is not affected by fingertip and joint occlusions and does not require hand pose ground truth. Accordingly, the method can produce more accurate pixel-wise hand segmentation in an automated manner, with less human effort. The method can thus be utilized to generate a large multi-modal hand activity video dataset having hand segmentation labels, which is useful for training machine learning models, such as deep neural networks.

18 Claims, 6 Drawing Sheets

(51) Int. Cl.
| | |
|---|---|
| G06T 7/30 | (2017.01) |
| G06T 7/70 | (2017.01) |
| G06K 9/62 | (2022.01) |
| G06T 7/174 | (2017.01) |
| G06T 7/136 | (2017.01) |
| G06V 40/10 | (2022.01) |

(52) U.S. Cl.
CPC ............... *G06T 7/174* (2017.01); *G06T 7/30* (2017.01); *G06T 7/70* (2017.01); *G06V 40/107* (2022.01); *G06T 2207/10016* (2013.01); *G06T 2207/10028* (2013.01); *G06T 2207/10048* (2013.01); *G06T 2207/20081* (2013.01); *G06T 2207/20084* (2013.01); *G06T 2207/20092* (2013.01); *G06T 2207/30196* (2013.01)

(56) References Cited

U.S. PATENT DOCUMENTS

| | | | | |
|---|---|---|---|---|
| 2012/0289850 | A1* | 11/2012 | Xu | A61B 5/015 600/529 |
| 2015/0244946 | A1* | 8/2015 | Agaian | H04N 5/33 348/164 |
| 2016/0202724 | A1* | 7/2016 | Chang | G06F 3/017 345/156 |
| 2017/0109599 | A1* | 4/2017 | Gupta | G06T 7/136 |
| 2019/0080431 | A1* | 3/2019 | Choi | G06V 10/803 |
| 2020/0279121 | A1* | 9/2020 | Stanimirovic | G06V 10/143 |

OTHER PUBLICATIONS

Zhang, Z., Zhang, X., Peng, C., Cheng, D., Sun, J.: Exfuse: Enhancing feature fusion for semantic segmentation. In: ECCV. (2018).
Xie, S., Girshick, R., Dollr, P., Tu, Z., He, K.: Aggregated residual transformations for deep neural networks. In: CVPR. (2017).
Jin, J., Dundar, A., Culurciello, E.: Flattened convolutional neural networks for feedforward acceleration. arXiv:1412.5474 (2014).
Wang, M., Liu, B., Foroosh, H.: Design of efficient convolutional layers using single intra-channel convolution, topological subdivisioning and spatial "bottleneck" structure. arXiv:1608.04337 (2016).
Zoph, B., Vasudevan, V., Shlens, J., Le, Q.V.: Learning transferable architectures for scalable image recognition. In: CVPR. (2018).
Holschneider, M., Kronland-Martinet, R., Morlet, J., Tchamitchian, P.: A real-time algorithm for signal analysis with the help of the wavelet transform. In: Wavelets:Time-Frequency Methods and Phase Space. (1989) 289-297.
Giusti, A., Ciresan, D., Masci, J., Gambardella, L., Schmidhuber, J.: Fast image scanning with deep max-pooling convolutional neural networks. In: ICIP. (2013).
Papandreou, G., Kokkinos, I., Savalle, P.A.: Modeling local and global deformations in deep learning: Epitomic convolution, multiple instance learning, and sliding window detection. In: CVPR. (2015).
Abadi, M., Agarwal, A., et al.: Tensor flow: Large-scale machine learning on heterogeneous distributed systems. arXiv:1603.04467 (2016).
Hariharan, B., Arbelaez, P., Girshick, R., Malik, J.: Hypercolumns for object segmentation and fine-grained localization. In: CVPR. (2015).
Russakovsky, O., Deng, J., Su, H., Krause, J., Satheesh, S., Ma, S., Huang, Z., Karpathy, A., Khosla, A., Bernstein, M., Berg, A.C, Fei-Fei, L.: ImageNet Large Scale Visual Recognition Challenge. IJCV (2015).
Ioffe, S., Szegedy, C.: Batch normalization: Accelerating deep network training by reducing internal covariate shift. In: ICML. (2015).
Hariharan, B., Arbelaez, P., Bourdev, L., Maji, S., Malik, J.: Semantic contours from inverse detectors. In: ICCV. (2011).
Wang, P., Chen, P., Yuan, Y., Liu, D., Huang, Z., Hou, X., Cottrell, G.: Understanding convolution for semantic segmentation. arXiv:1702.08502 (2017).
Dai, J., Qi, H., Xiong, Y., Li, Y., Zhang, G., Hu, H., Wei, Y.: Deformable convolutional networks. In: ICCV. (2017).
Lin, T.Y., et al.: Microsoft COCO: Common objects in context. In: ECCV. (2014).
Hinton, G., Vinyals, O., Dean, J.: Distilling the knowledge in a neural network. In: NIPS. (2014).
Sun, C., Shrivastava, A., Singh, S., Gupta, A.: Revisiting unreasonable effectivenessof data in deep learning era. In: ICCV. (2017).
Li, X., Liu, Z., Luo, P., Loy, C.C., Tang, X.: Not all pixels are equal: Difficultyaware semantic segmentation via deep layer cascade. In: CVPR. (2017).
Wu, Z., Shen, C., van den Hengel, A.: Wider or deeper: Revisiting the resnet model for visual recognition. arXiv:1611.10080 (2016).
Wang, G., Luo, P., Lin, L.,Wang, X.: Learning object interactions and descriptions for semantic image segmentation. In: CVPR. (2017).
Luo, P., Wang, G., Lin, L., Wang, X.: Deep dual learning for semantic image segmentation. In: ICCV. (2017).
Bulo, S.R., Porzi, L., Kontschieder, P.: In-place activated batch norm for memory optimized training of dnns. In: CVPR. (2018).
Vagiz Aksoy, Tune Ozan Aydin, Aljoša Smoli'c, and Marc Pollefeys. Unmixing-based soft color segmentation for image manipulation. ACM Trans. Graph., 36(2): 19:1-19:19, 2017.
Mykhaylo Andriluka, Jasper Uijlings, and Vittorio Ferrari. Fluid annotation: A humanmachine collaboration interface for full image annotation, pp. 1957-1966, Oct. 2018. doi: 10.1145/3240508. 3241916.
Sven Bambach, Stefan Lee, David J Crandall, and Chen Yu. Lending a hand: Detecting hands and recognizing activities in complex egocentric interactions. In Proceedings of the IEEE International Conference on Computer Vision, pp. 1949-1957, 2015.
Tewodros A Biresaw, Tahir Nawaz, James Ferryman, and Anthony I Dell. Vitbat: Video tracking and behavior annotation tool. In 2016 13th IEEE International Conference on Advanced Video and Signal Based Surveillance (AVSS), pp. 295-301. IEEE, 2016.
A. K. Bojja, F. Mueller, S. R. Malireddi, M. Oberweger, V. Lepetit, C. Theobalt, K. M. Yi, and A. Tagliasacchi. Handseg: An automatically labeled dataset for hand segmentation from depth images. In 2019 16th Conference on Computer and Robot Vision (CRV), pp. 151-158, May 2019. doi: 10.1109/CRV.2019.00028.
Léon Bottou. Large-scale machine learning with stochastic gradient descent. In Proceedings of COMPSTAT'2010, pp. 177-186. Springer, 2010.
Kan Chen, Trung Bui, Chen Fang, Zhaowen Wang, and Ram Nevatia. Amc: Attentionguided multi-modal correlation learning for image search. In Proceedings of the IEEE Conference on Computer Vision and Pattern Recognition, pp. 2644-2652, 2017.
Guillermo Garcia-Hernando, Shanxin Yuan, Seungryul Baek, and Tae-Kyun Kim. First-person hand action benchmark with rgb-d videos and 3d hand pose annotations. In Proceedings of the IEEE conference on computer vision and patter recognition, pp. 409-419, 2018.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.
Di Hu, Feiping Nie, and Xuelong Li. Deep multimodal clustering for unsupervised audiovisual learning. In The IEEE Conference on Computer Vision and Pattern Recognition (CVPR), Jun. 2019.
Hoang Le, Long Mai, Brian Price, Scott Cohen, Hailin Jin, and Feng Liu. Interactive boundary prediction for object selection. In The European Conference on Computer Vision (ECCV), Sep. 2018.
Hubert Lin, Paul Upchurch, and Kavita Bala. Block annotation: Better image annotation for semantic segmentation with sub-image decomposition, Feb. 2020.
Dong Liu, Yue Li, Jianping Lin, and Houqiang Li. Deep learning-based video coding: A review and a case study, Apr. 2019.

(56) References Cited

OTHER PUBLICATIONS

Supreeth Narasimhaswamy, ZhengweiWei, YangWang, Justin Zhang, and Minh Hoai. Contextual attention for hand detection in the wild. In Proceedings of the IEEE International Conference on Computer Vision, pp. 9567-9576, 2019.
Jifeng Ning, Lei Zhang, David Zhang, and Chengke Wu. Interactive image segmentation by maximal similarity based region merging. Pattern Recognition, 43(2):445-456, 2010.
X. Qin, S. He, Z. Zhang, M. Dehghan, and M. Jagersand. Bylabel: A boundary based semi-automatic image annotation tool. In 2018 IEEE Winter Conference on Applications of Computer Vision (WACV), pp. 1804-1813, 2018.
Sarah Rastegar, Mahdieh Soleymani, Hamid R. Rabiee, and Seyed Mohsen Shojaee. Mdl-cw: A multimodal deep learning framework with cross weights. In The IEEE Conference on Computer Vision and Pattern Recognition (CVPR), Jun. 2016.
Javier Romero, Dimitrios Tzionas, and Michael J. Black. Embodied hands: Modeling and capturing hands and bodies together. ACM Transactions on Graphics, (Proc. SIGGRAPH Asia), 36(6), Nov. 2017.
Bryan Russell, Antonio Torralba, Kevin Murphy, and William Freeman. Labelme: A database and web-based tool for image annotation International Journal of Computer Vision, 77, May 2008. doi: 10.1007/s11263-007-0090-8.
Roy Shilkrot, Supreeth Narasimhaswamy, Saif Vazir, and Minh Hoai. Workinghands: A hand-tool assembly dataset for image segmentation and activity mining. In BMVC, 2019.
Yuxiang Sun, Weixun Zuo, and Ming Liu. Rtfnet: Rgb-thermal fusion network for semantic segmentation of urban scenes. IEEE Robotics and Automation Letters, 4(3): 2576-2583, 2019.
Qiang Wang, Li Zhang, Luca Bertinetto, Weiming Hu, and Philip HS Torr. Fast online object tracking and segmentation: A unifying approach. In Proceedings of the IEEE conference on computer vision and pattern recognition, pp. 1328-1338, 2019.
Xiao-Yongwei, Yu-Gang Jiang, and Chong-Wah Ngo. Concept-driven multi-modality fusion for video search. IEEE Transactions on Circuits and Systems for Video Technology, 21(1):62-73, 2011.
Aaron Wetzler, Ron Slossberg, and Ron Kimmel. Rule of thumb: Deep derotation for improved fingertip detection. In Mark W. Jones Xianghua Xie and Gary K. L. Tam, editors, Proceedings of the British Machine Vision Conference (BMVC), pp. 33.1-33.12 BMVA Press, Sep. 2015. ISBN 1-901725-53-7. doi: 10.5244/C.29.33. URL https://dx.doi.org/10.5244/C.29.33.
Lishi Zhang, Chenghan Fu, and Jia Li. Collaborative annotation of semantic objects in images with multi-granularity supervisions, pp. 474-482, Oct. 2018. doi: 10.1145/ 3240508.3240540.
Qiang Zhang, Yi Liu, Rick S Blum, Jungong Han, and Dacheng Tao. Sparse representation based multi-sensor image fusion for multi-focus and multi-modality images: A review. Information Fusion, 40:57-75, 2018.
AC Burton. The range and variability of the blood flow in the human fingers and the vasomotor regulation of body temperature. American Journal of Physiology-Legacy Content, 127 (3):437 453, 1939.
Xavier Font-Aragones, Marcos Faundez-Zanuy. and Jiri Mekyska. Thermal hand image segmentation for biometric recognition. IEEE Aerospace and Electronic Systems Magazine, 28(6):4-14, 2013.
Qishen Ha, Kohei Watanabe, Takumi Karasawa, Yoshitaka Ushiku, and Tatsuya Harada. Mfnet: Towards real-time semantic segmentation for autonomous vehicles with multi-spectral scenes. In 2017 IEEE/RSJ International Conference on Intelligent Robots and Systems (IROS), pp. 5108-5115. IEEE, 2017.
Peng Wang and Xiangzhi Bai. Thermal infrared pedestrian segmentation based on conditional gan. IEEE transactions on image processing, 28(12):6007-6021, 2019.
Tae-Ho Yoon, Kyeong-Seop Kim, Jeong-Whan Lee, DongJun Kim, and Chul-Gyu Song. Image segmentation of human forearms in infrared image. In 2006 International Conference of the IEEE Engineering in Medicine and Biology Society, pp. 2762-2765. IEEE, 2006.
Felix Zhan. Hand gesture recognition with convolution neural networks. In 2019 IEEE 20th International Conference on Information Reuse and Integration for Data Science (IRI), pp. 295-298, 2019.
Vanhoucke, V.: Learning visual representations at scale. ICLR invited talk (2014).
Rachel Luo, Ozan Sener, and Silvio Savarese. Scene semantic reconstruction from egocentric rgb-d-thermal videos. In 2017 International Conference on 3D Vision (3DV), pp. 593-602. IEEE, 2017.
He, X., Zemel, R.S., Carreira-Perpindn, M.: Multiscale conditional random elds for image labeling. In: CVPR. (2004).
Shotton, J., Winn, J., Rother, C., Criminisi, A.: Textonboost for image understanding: Multi-class object recognition and segmentation by jointly modeling texture, layout, and context. IJCV (2009).
Kohli, P., Torr, P.H., et al.: Robust higher order potentials for enforcing label consistency. IJCV 82(3) (2009) 302-324.
Ladicky, L., Russell, C., Kohli, P., Torr, P.H.: Associative hierarchical crfs for object class image segmentation. In: ICCV. (2009).
Gould, S., Fulton, R., Koller, D.: Decomposing a scene into geometric and semantically consistent regions. In: ICCV. (2009).
Yao, J., Fidler, S., Urtasun, R.: Describing the scene as a whole: Joint object detection, scene classication and semantic segmentation. In: CVPR. (2012).
Grauman, K., Darrell, T.: The pyramid match kernel: Discriminative classication with sets of image features. In: ICCV. (2005).
Lazebnik, S., Schmid, C., Ponce, J.: Beyond bags of features: Spatial pyramid matching for recognizing natural scene categories. In: CVPR. (2006).
He, K., Zhang, X., Ren, S., Sun, J.: Spatial pyramid pooling in deep convolutional networks for visual recognition. In: ECCV. (2014).
Ronneberger, O., Fischer, P., Brox, T.: U-net: Convolutional networks for biomedical image segmentation. In: MICCAI. (2015).
Sadrinarayanan, V., Kendall, A., Cipolla, R.: Segnet: A deep convolutional encoder-decoder architecture for image segmentation. PAMI (2017).
Chen, L.C., Papandreou, G., Schro , F., Adam, H.: Rethinking atrous convolution for semantic image segmentation. arXiv:1706.05587 (2017).
Zhao, H., Shi, J., Qi, X., Wang, X., Jia, J.: Pyramid scene parsing network. In: CVPR. (2017).
Christian Zimmermann, Duygu Ceylan, Jimei Yang, Bryan Russell, Max Argus, and Thomas Brox. Freihand: A dataset for markeriess capture of hand pose and shape from single rgb images. In Proceedings of the IEEE International Conference on Computer Vision, pp. 813-822, 2019.
Chollet, F.: Xception: Deep learning with depthwise separable convolutions. ln:CVPR. (2017).
Sifre, L.: Rigid-motion scattering for image classication. PhD thesis (2014).
Howard, A.G., Zhu, M., Chen, B., Kalenichenko, D., Wang, W., Weyand, T., Andreetto, M., Adam, H.: Mobilenets: E cient convolutional neural networks for mobile vision applications. arXiv:1704. 04861 (2017).
Zhang, X., Zhou, X., Lin, M., Sun, J.: Shuenet: An extremely efficient convolutional neural network for mobile devices. In: CVPR. (2018).
Qi, H., Zhang, Z., Xiao, B., Hu, H., Cheng, B., Wei, Y., Dai, J.: Deformable convolutional networks—coco detection and segmentation challenge 2017 entry. ICCV COCO Challenge Workshop (2017).
Mostajabi, M., Yadollahpour, P., Shakhnarovich, G.: Feedforward semantic segmentation with zoom-out features. In: CVPR. (2015).
Dai, J., He, K., Sun, J.: Convolutional feature masking for joint object and stuff segmentation. In: CVPR. (2015).
Farabet, C., Couprie, C., Najman, L., LeCun, Y.: Learning hierarchical features for scene labeling. PAMI (2013).
Eigen, D., Fergus, R.: Predicting depth, surface normals and semantic labels with a common multi-scale convolutional architecture In: ICCV (2015).
Pinheiro, P., Collobert, R.: Recurrent convolutional neural networks for scene labeling. In: ICML. (2014).

(56) References Cited

OTHER PUBLICATIONS

Lin, G., Shen, C., van den Hengel, A., Reid, I.: Efficient piecewise training of deep structured models for semantic segmentation. In: CVPR. (2016).
Chen, L.C., Yang, Y., Wang, J., Xu, W., Yuille, A.L.: Attention to scale: Scaleaware semantic image segmentation. In: CVPR. (2016).
Chen, L.C., Papandreou, G., Kokkinos, I., Murphy, K., Yuille, A.L.: Deeplab: Semantic image segmentation with deep convolutional nets, atrous convolution, and fully connected crfs. TPAMI (2017).
Krahenbuhl, P., Koltun, V.: Efficient inference in fully connected crfs with gaussian edge potentials. In: NIPS. (2011).
Adams, A., Baek, J., Davis, M.A.: Fast high-dimensional filtering using the permutohedral lattice. In: Eurographics. (2010).
Chen, L.C., Papandreou, G., Kokkinos, I., Murphy, K., Yuille, A.L.: Semantic image segmentation with deep convolutional nets and fully connected crfs In: ICLR. (2015).
Bell, S., Upchurch, P., Snavely, N., Bala, K.: Material recognition in the wild with the materials in context database. In: CVPR. (2015).
Zheng, S., Jayasumana, S., Romera-Paredes, B., Vineet, V., Su, Z., Du, D., Huang, C., Torr, P.: Conditional random elds as recurrent neural networks In: ICCV.(2015).
Liu, Z., Li, X., Luo, P., Loy, C.C., Tang, X.: Semantic image segmentation via deep parsing network. In: ICCV. (2015).
Papandreou, G., Chen, L.C., Murphy, K., Yuille, A.L.: Weakly- and semisupervised learning of a dcnn for semantic image segmentation. In: ICCV. (2015).
Schwing, A.G., Urtasun, R.: Fully connected deep structured networks. arXiv:1503.02351 (2015).
Jampani, V., Kiefel, M., Gehler, P.V.: Learning sparse high dimensional filters: Image filtering, dense crfs and bilateral neural networks. In: CVPR (2016).
Vemulapalli, R., Tuzel, O., Liu, M.Y., Chellappa, R.: Gaussian conditional random eld network for semantic segmentation. In: CVPR. (2016).
Chandra, S., Kokkinos, I.: Fast, exact and multi-scale inference for semantic image segmentation with deep Gaussian CRFs. In: ECCV (2016).
Chandra, S., Usunier, N., Kokkinos, I.: Dense and low-rank gaussian crfs using deep embeddings. In: ICCV. (2017).
Liu, W., Rabinovich, A., Berg, A.C.: Parsenet: Looking wider to see better. arXiv:1506.04579 (2015).
Newell, A., Yang, K., Deng, J.: Stacked hourglass networks for human pose estimation. In: ECCV. (2016).
Lin, T.Y., Dollar, P., Girshick, R., He, K., Hariharan, B., Belongie, S.: Feature pyramid networks for object detection. In: CVPR. (2017).
Shrivastava, A., Sukthankar, R., Malik, J., Gupta, A.: Beyond skip connections: Top-down modulation for object detection. arXiv:1612.06851 (2016).
Fu, C.Y., Liu, W., Ranga, A., Tyagi, A., Berg, A.C.: Dssd: Deconvolutional single shot detector. arXiv:1701.06659 (2017).
Noh, H., Hong, S., Han, B.: Learning deconvolution network for semantic segmentation. In: ICCV. (2015).
Lin, G., Milan, A., Shen, C., Reid, I.: Re nenet: Multi-path refinement networks with identity mappings for high-resolution semantic segmentation. In: CVPR. (2017).
Pohlen, T., Hermans, A., Mathias, M., Leibe, B.: Full-resolution residual networks for semantic segmentation in street scenes. In: CVPR (2017).
Peng, C., Zhang, X., Yu, G., Luo, G., Sun, J.: Large kernel matters improve semantic segmentation by global convolutional network. In: CVPR. (2017).
Islam, M.A., Rochan, M., Bruce, N.D, Wang, Y.: Gated feedback refinement network for dense image labeling. In: CVPR. (2017).
Wojna, Z., Ferrari, V., Guadarrama, S., Silberman, N., Chen, L.C., Fathi, A., Uijlings, J.: The devil is in the decoder. In: BMVC. (2017).
David Acuna, Huan Ling, Arnlan Kar, and Sanja Fidler. Efficient interactive annotation of segmentation datasets with polygon-mn++ In CVPR, 2018. 4, 5, 6.

Jorg Appenrodt. Ayoub Al-Hamadi, and Bernd Michaelis. Data gathering for gesture recognition systems based on single color-, stereo color-and thermal cameras. International Journal of Signal Processing, Image Processing and Pattern Recognition, Feb. 2010.
Sven Barnbach, Stefan Lee. David J Crandall, and Chen Yu. Lending a hand: Detecting hands and recognizing activities in complex egocentric interactions. In Proceedings of the IEEE International Conference on Computer Vision, pp. 1949-1957, 2015. 1, 2, 3.
A. K. Bojja, F. Mueller, S. R. Malireddi, M. Oberweger, V. Lepetit, C. Theobalt, K. M. Yi, and A. Tagliasacchi. Handseg: An automatically labeled dataset for hand segmentation from depth images. In 2019 16th Conference on Computer mid Robot Vision (CRV), pp. 151-158, May 2019. 1, 2.
Minjie Cai. Kris M Kitani, and Yoichi Sato. Understanding hand-object manipulation with grasp types and object attributes In Robotics: Science and Systems, vol. 3 Ann Arbor, Michigan; Jan. 2016.
Liang-Chieh Chen, George Papandreou, lasonas Kokkinos, Kevin Murphy, and Alan L Yuille. Deeplab: Semantic image segmentation with deep convolutional nets, atrous convolution, and fully connected crfs. IEEE transactions on pattern analysis mid machine intelligence, 40(4):834-848, Feb. 2017.
Liang-Chieh Chen, Yukun Zhu, George Papandreou, Florian Schroff, and Hartwig Adam. Encoder-decoder with atrous separable convolution for semantic image segmentation. In Proceedings of the European conference on computer vision (ECCV), pp. 801 818, 2018. 2, 6, 8.
Chiho Choi, Sangpil Kim, and Karthik Ramani. Learning hand articulations by hallucinating heat distribution. In Proceedings of the IEEE International Conference on Computer Vision, pp. 3104-3113, Feb. 2017.
Yukyung Choi, Namil Kim, Soonmin Hwang, Kibaek Park, Jae Shin Yoon, Kyounghwan An, and In So Kweon. Kaist multi-spectral clay/night data set for autonomous and assisted driving. IEEE Transactions on Intelligent Transportation Systems. 19(3):934948, Feb. 2018.
Tia Deng, Wei Dong, Richard Socher, Li-Jia Li, Kai Li, and Li Fei-Fei. Imagenet: A large-scale hierarchical image database. In 2009 IEEE conference on computer vision and pattern recognition, pp. 248-255. Jun. 2009.
Chaitanya Devaguptapu, Ninad Akolekar, Manuj M Sharma, and Vineeth N Balasubramanian. Borrow from anywhere: Pseudo multimodal object detection in thermal imagery. In Proceedings of the IEEE Conference on Computer Vision and Pattern Recognition Workshops, pp. 0-0, Feb. 2019.
Ali Erol, George Bebis, MirceaNicolescu, Richard D Boyle, and Xander Twombly. Vision-based hand pose estimation: A review. Computer Vision and Image Understanding, 108(1-2):52 73. Jan. 2007.
Alireza Fathi, Xiaofeng Ren, and James M Rehg. Learning to recognize objects in egocentric activities. In CI/PR 2011, pp. 3281-3288 IEEE, Feb. 2011.
Liuhao Ge, Hui Liang, Junsong Yuan, and Daniel Thalmann. 3d convolutional neural networks for efficient and robust hand pose estimation from single depth images. In Proceedings of the IEEE Conference on Computer Vision and Pattern Recognition, pp. 1991-2000, Jan. 2017.
Oliver Glauser, Shihao Wu, Daniele Panozzo, Otmar Hilliges, and Olga Sorkine-Hornung. Interactive hand pose estimation using a stretch-sensing soft glove ACM Transactions 011 Graphics (TOG), 38(4):41, Jan. 2019.
Wilfried Hartmann. Sebastian Tilch, Henri Eisenbeiss, and Konrad Schindler. Determination of the uav position by automatic processing of thermal images. International Archives of the Photogrammetry Remote Sensing and Spatial Information Sciences, 39:B6, Feb. 2012.
Shuiwang Ji, Wei Xu, Ming Yang, and Kai Yu. 3d convolutional neural networks for human action recognition. IEEE transactions on pattern analysis and machine intelligence, 35(1):221-231, Feb. 2012.

(56) References Cited

OTHER PUBLICATIONS

Cem Keskin, Furkan Krrair, Yunus Emre Kara, and Laie Akarun. Real time hand pose estimation using depth sensors. In Consumer depth cameras for computer vision, pp. 119-137 Springer, 2013. 1, 2.

My Kieu, Andrew D Bagclanov, Marco Bertini, and Alberto Del Bimbo. Domain adaptation for privacy-preserving pedestrian detection in thermal imagery. In international Conference on Image Analysis and Processing, pp. 203-213. Springer, Feb. 2019.

Sangpil Kim, Nick Winovich, Hyung-Gun Chi, Guang Lin, and Karthik Ramani. Latent transformations neural network for object view synthesis. The Visual Computer, pp. 1-15, Jan. 2019.

Diederik P Kingma and Jimmy Ba. Adam: A method for stochastic optimization. 2014.

Dheng Li and Kris M Kitani. Pixel-level hand detection in egocentric videos. In Proceedings of the IEEE Conference on Computer Vision and Pattern Recognition, pp. 3570-3577. Feb. 2013.

Yin Li, Zhefan Ye, ru1d .Trunes M Rehg. Delving into egocentric actions. In Proceedings of the TEEE Conference on Computer Vision and Pattern Recognition, pp. 287-295,2015.

Guosheng Lin, Anton Milan, Chunhua Shen, and Ian Reid. Refinenet: Multi-path refinement networks for high resolution semantic segmentation. In Proceedings of the IEEE conference on computer vision and pattern recognition, pp. 1925-1934, 2017.

Konstantinos Makantasis, Antonios Nikitakis, Anastasios D Doulan1is, Nikolaos D Doulamis, and Ioannis Papaefstathiou. Data-driven background subtraction algorithm for in-camera acceleration in thermal imagery. IEEE Transactions on Circuits and Syslems for Video Technology, 28(9):2090-2104, Feb. 2017.

Gourav Modanwal and Kishor Sarawadekar. A robust wrist point detection algorithm using geometric features. Pattern Recognition Letters, 110:72-78, Mar. 2018.

Hyeonwoo Noh, Seunghoon Hong, and Bohyung Han. Learning deconvolution network for semantic segmentation. In Proceedings of the IEEE international conference on computer vision, pp. 1520-1528, Feb. 2015.

Ason Oikonomidis, Nikolaos Kyriazis, and Antonis A Argyros. Efficient model-based 3d tracking of band articulations using kinect. In BmVC, vol. 1, p. 3, Jan. 2011.

Adam Paszke, Abbishek Cbaurasia, Sangpil Kim, and Eugenio Culurciello. Enet: A deep neural network architecture tor real-time semantic segmentation. arXiv preprint arXiv: 1606.02147, Feb. 2016.

Xiaofeng Ren and Chunhui Gu. Figure-ground segmentation improves handled object recognition in egocentric video. In 2010 JEEE Computer Society Conference on Computer Vision and Pattern Recognition, pp. 3137-3144. IEEE, Feb. 2010.

Thomas Schlomer, Benjantln Poppinga, Niels Henze, and SusanneBoll. Gesture recognition with a wii controller. In Proceedings of the 2nd international conference on Tangible and embedded interaction, pp. 11-14. ACM, Jan. 2008.

Suriya Singh, Chetan Arora, and CV Jawahar. First person action recognition using deep learned descriptors. In Proceedings of the IEEE Conference on Computer Vision and Pattern Recognition, pp. 2620-2628, Feb. 2016.

Yuxiang Sun, Weixun Zuo, and Ming Liu. Rtfnet: Rgbthermal fusion network for semantic segmentation of urban scenes. IEEE Robotics and Automation Letters, 4(3):2576-2583, 2019. 2, 6, 8.

Jonathan Tompson, Murphy Stein, Yann Lecun, and Ken Perlin. Real-time continuous pose recovery of human hands using convolutional networks. ACM Transactions on Graphics (ToG), 33(5):169, Feb. 2014.

Aisha Khan Urooj and Ali Borji. Analysis of hand segmentation in the wild. In Proceedings of the IEEE Conference on Computer Vision and Pattern Recognition, pp. 4710-4719, 2018 1, 2, 3, 6, 8.

Panqu Wang, Pengfei Chen, Ye Yuan, Ding Liu, Zehua Huang, Xiaodi Hou, and Garrison Cottrell. Understanding convolution for semantic segmentation. In 2018 IEEE winter conference on applications of computer vision (WACV), pp. 14511460. IEEE, 2018. 6, 8.

Robert Y Wang and Jovan Popovic. Real-time hand-tracking with a color glove. ACM transactions on graphics (TOG), 28(3):63, Jan. 2009.

Sean Ward, Jordon Hensler, Bilal Alsalam, and Luis Felipe Gonzalez. Autonomous uavs wildlife detection using thermal imaging, predictive navigation and computer vision. In 2016 IEEE Aerospace Conference, pp. 1-8. IEEE, Feb. 2016.

Hengshuang Zhao, Jianping Shi, Xiaojuan Qi, Xiaogang Wang, and Jiaya Jia. Pyramid scene parsing network. In Proceedings of the IEEE conference on computer vision and pattern recognition, pp. 2881 2890, 2017. 2, 6, 8.

Everingham, M., Eslami, S.M.A., Gool, L.V., Williams, C.K.I., Winn, J., Zisserman, A.: The pascal visual object classes challenge a retrospective. IJCV (2014).

Mottaghi, R., Chen, X., Liu, X., Cho, N.G., Lee, S.W., Fidler, S., Urtasun, R., Yuille, A.: The role of context for object detection and semantic segmentation in the wild. In: CVPR. (2014).

Cordts, M., Omran, M., Ramos, S., Rehfeld, T., Enzweiler, M., Benenson, R., Franke, U., Roth, S., Schiele, B.: The cityscapes dataset for semantic urban scene understanding. In: CVPR. (2016).

Zhou, B., Zhao, H., Puig, X., Fidler, S., Barriuso, A., Torralba, A.: Scene parsing through ade20k dataset. In: CVPR. (2017).

Caesar, H., Uijlings, J., Ferrari, V.: COCO-Stu : Thing and stu classes in context. In: CVPR. (2018).

LeCun, Y., Bottou, L., Bengio, Y., Ha ner, P.: Gradient-based learning applied to document recognition. In: Proc. IEEE. (1998).

Krizhevsky, A., Sutskever, I., Hinton, G.E.: Imagenet classication with deep convolutional neural networks. In: NIPS. (2012).

Sermanet, P., Eigen, D., Zhang, X., Mathieu, M., Fergus, R., LeCun, Y.: Overfeat: Integrated recognition, localization and detection using convolutional networks. In: ICLR. (2014).

Simonyan, K., Zisserman, A.: Very deep convolutional networks for large-scale image recognition. In: ICLR. (2015).

Szegedy, C., Liu, W., Jia, Y., Sermanet, P., Reed, S., Anguelov, D., Erhan, D., Vanhoucke, V., Rabinovich, A.: Going deeper with convolutions. In: CVPR. (2015).

Long, J., Shelhamer, E., Darrell, T.: Fully convolutional networks for semantic segmentation. In: CVPR. (2015).

* cited by examiner

PIXEL-WISE HAND SEGMENTATION OF MULTI-MODAL HAND ACTIVITY VIDEO DATASET

This application claims the benefit of priority of U.S. provisional application Ser. No. 62/942,591, filed on Dec. 2, 2019 the disclosure of which is herein incorporated by reference in its entirety.

GOVERNMENT LICENSE RIGHTS

This invention was made with government support under contract numbers DUE 1839971 and OIA 1937036 awarded by the National Science Foundation. The government has certain rights in the invention.

FIELD

The device and method disclosed in this document relates to the labeling of computer vision datasets and, more particularly, to automated labeling of multi-modal video data with pixel-wise hand segmentation labels.

BACKGROUND

Unless otherwise indicated herein, the materials described in this section are not admitted to be the prior art by inclusion in this section.

Hands are crucial in many industrial computer vision applications, such as augmented reality, virtual reality, or human-computer interaction. Recognizing hands with vision systems is necessary to enable interactions between people and digital devices. Therefore, understanding hands with computer vision systems has been deeply explored through hand tracking, hand pose estimation, grasp detection, hand gesture recognition, multi-view prediction, and hand-action classification.

Many of these applications require first-person-view images of hands in actions with tools or objects, which include annotations segmenting the hands from the environment to increase the accuracy of performance. However, creating a dataset with pixel-wise segmentation of hands that are interacting with tools or objects is challenging because (a) fingertips are often occluded by the hand dorsum and tools or objects in the first-person view, (b) the tools or objects are held with various grasps, (c) the shapes of the tools or objects are infinite, and (d) hand movements can be complex.

Current methods for generating such a dataset often rely on manual processes, which are inefficient and costly. Particularly, a traditional approach to create a RGB hand segmentation video dataset is through manual polygon drawing. However, polygon drawing does not enable the annotation of smooth curves or holes. Moreover, the time and cost of person-in-the-loop segmentation grows linearly as the number of frames increases, which reduces the scalability. Therefore, what is need is an segmentation method for creating a segmented hand video dataset that enables the annotation of smooth curves and minimizes the amount of human effort in the loop.

SUMMARY

A method for pixel-wise hand segmentation of image data is discloses. The method comprises receiving, with a processor, image data including a photographic image and a thermal image of a scene including hands of a person in an environment, the photographic image and the thermal image having been captured concurrently by a camera system. The method further comprises determining, with the processor, a first binary mask based on the thermal image, the first binary mask defining a first portion of the thermal image estimated to correspond to the person and a second portion of the thermal image estimated to not correspond to the person. The method further comprises labeling, with the processor, each respective pixel of the photographic image as one of at least one first class and a second class based on the first binary mask, the at least one first class indicating that the respective pixel corresponds to the hands of the person, the second class indicating that the respective pixel does not correspond to the hands of the person.

A non-transitory computer-readable medium for pixel-wise hand segmentation of image data is disclosed. The computer-readable medium stores program instructions that, when executed by a processor, cause the processor to read, from a memory, image data including a photographic image and a thermal image of a scene including hands of a person in an environment, the photographic image and the thermal image having been captured concurrently by a camera system. The computer-readable medium further stores program instructions that, when executed by a processor, cause the processor to determine a first binary mask based on the thermal image, the first binary mask defining a first portion of the thermal image estimated to correspond to the person and a second portion of the thermal image estimated to not correspond to the person. The computer-readable medium further stores program instructions that, when executed by a processor, cause the processor to label each respective pixel of the photographic image as one of at least one first class and a second class based on the first binary mask, the at least one first class indicating that the respective pixel corresponds to the hands of the person, the second class indicating that the respective pixel does not correspond to the hands of the person.

A further method for pixel-wise hand segmentation of image data is disclosed. The method comprises receiving, with a processor, image data including a photographic image, a depth image, and a thermal image of a scene including hands of a person in an environment, the photographic image, the depth image, and the thermal image having been captured concurrently by a camera system. The method further comprises labeling, with the processor, each respective pixel of the photographic image as one of a first class and a second class by executing program instructions of a neural network that takes the photographic image, the depth image, and the thermal image as inputs, the first class indicating that the respective pixel corresponds to the hands of the person, the second class indicating that the respective pixel does not correspond to the hands of the person.

BRIEF DESCRIPTION OF THE DRAWINGS

The foregoing aspects and other features of the methods are explained in the following description, taken in connection with the accompanying drawings.

DETAILED DESCRIPTION

Figure 1A:
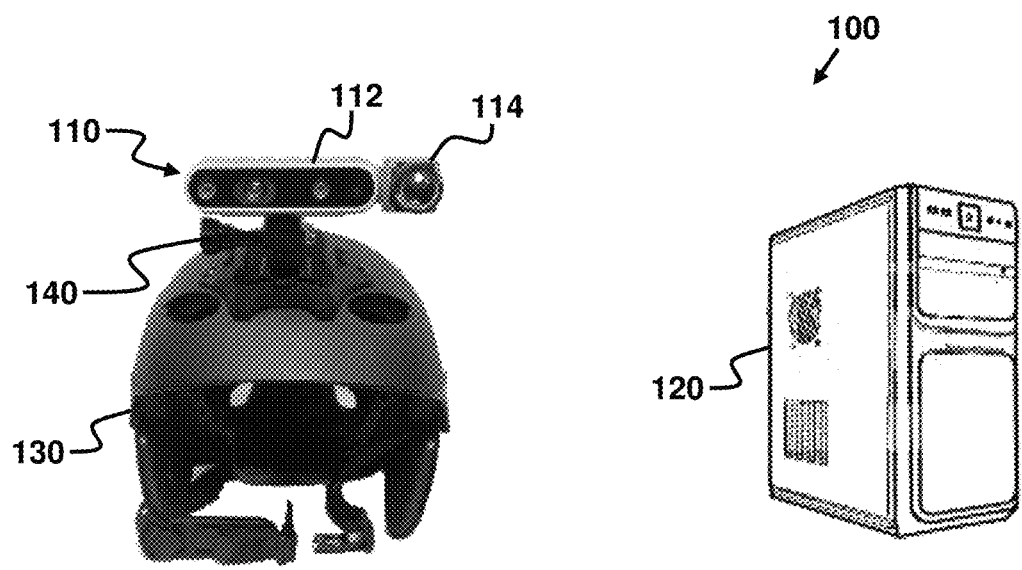
FIG. 1A shows a system for generating a multi-modal video dataset with pixel-wise hand segmentation.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

With reference to FIG. 1A, a system 100 for generating a multi-modal video dataset with pixel-wise hand segmentation is described. To address the challenges discussed above, the system 100 advantageously utilizes multi-modal image data that includes thermal images of the hands, which enable efficient pixel-wise hand segmentation of the image data. By using the thermal images, the system 100 is not affected by fingertip and joint occlusions and does not require hand pose ground truth. Accordingly, the system 100 can produce more accurate pixel-wise hand segmentation in an automated manner, with less human effort. The system 100 can thus be utilized to generate a large multi-modal hand activity video dataset having hand segmentation labels, which is useful for training machine learning models, such as deep neural networks.

Figure 1B:
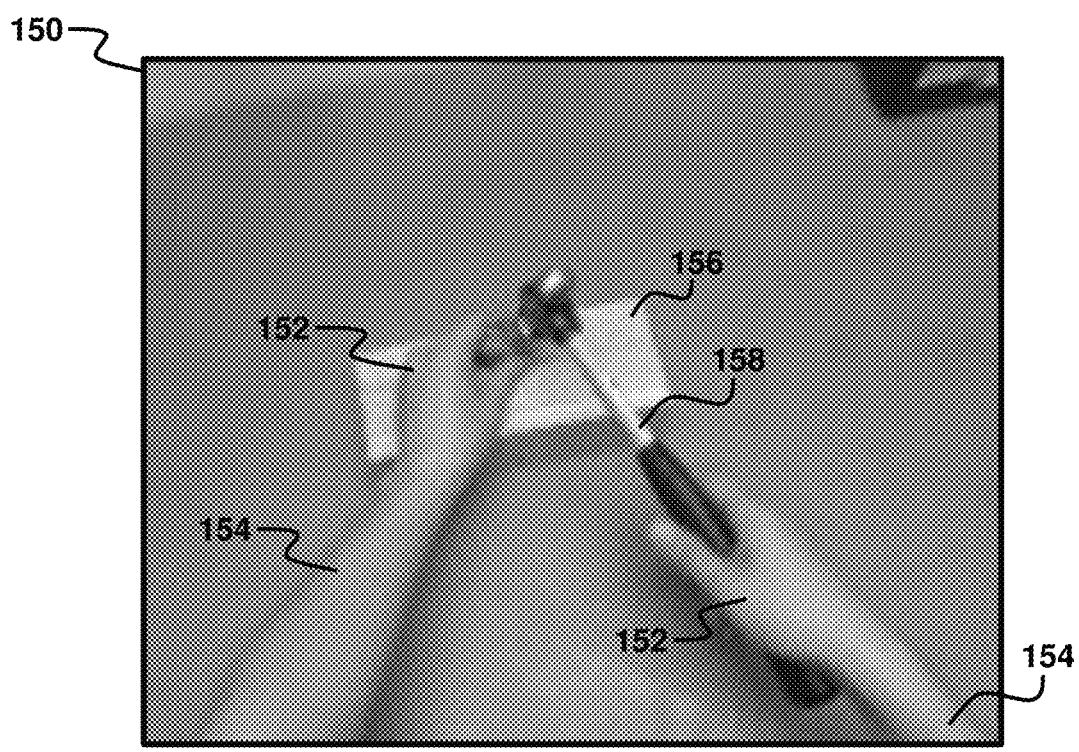
FIG. 1B shows an exemplary image frame captured by the camera system of FIG. 1A

The system 100 comprises at least a camera system 110 for capturing video/image data and a data processing system 120 for annotating the video/image data with pixel-wise hand segmentation labels. The camera system 110 captures video/image data of a user's hands as the user performs a task, which may involve interactions with one or more objects and tools. The camera system 110 includes a multi-modal or multi-spectral assortment of sensors at least including an RGB-D camera 112 and a thermal camera 114, but preferably also includes an inertial measurement unit (IMU). FIG. 1B shows an exemplary image frame 150 captured by the camera system 110. As can be seen, the user's hands 152 and forearms 154 are visible in the image frame 150 as the user hammers a nail into a wood block 156 using a hammer 158. The camera system 110 is utilized to capture a variety of videos in which the user interacts with objects and tools using his or her hands.

Returning to FIG. 1A, in the illustrated embodiment, the camera system 110 is mounted to a helmet 130 such that the video/image data is captured from a first-person perspective by the camera system 110. In at least one embodiment, camera system 110 further includes a housing or frame 140 that is configured to rigidly support the RGB-D camera 112, the thermal camera 114, and the IMU in such a manner that they have fixed positions and orientations with respect to one another. In one embodiment, the housing or frame is additionally configured to mount the RGB-D camera 112, the thermal camera 114, and the IMU to the helmet 130. In alternative embodiments, essentially similar video/image data can be captured from an over-head perspective in which the camera system 110 is mounted above a workspace, with a view of the user's hands as her or she performs the task. It should be appreciated that the arrangement of the camera system 110 may correspond to intended use for the video dataset that is to be generated.

The data processing system 120 receives the video/image data captured by the camera system 110 and processes the video/image data to provide pixel-wise hand-segmentation. Particularly, data processing system 120 annotates each pixel in the video/image data with a class label indicating that the respective pixel (i) corresponds to a hand or (ii) does not correspond to a hand. The resulting hand-segmentation video dataset has a wide variety of applications in augmented reality, virtual reality, or human-computer interaction. Particularly, hand-segmentation video dataset can be used to train machine learning models, such as deep neural networks, that perform complex computer vision tasks such as hand tracking, hand pose estimation, grasp detection, hand gesture recognition, multi-view prediction, and hand-action classification.

Figure 2:
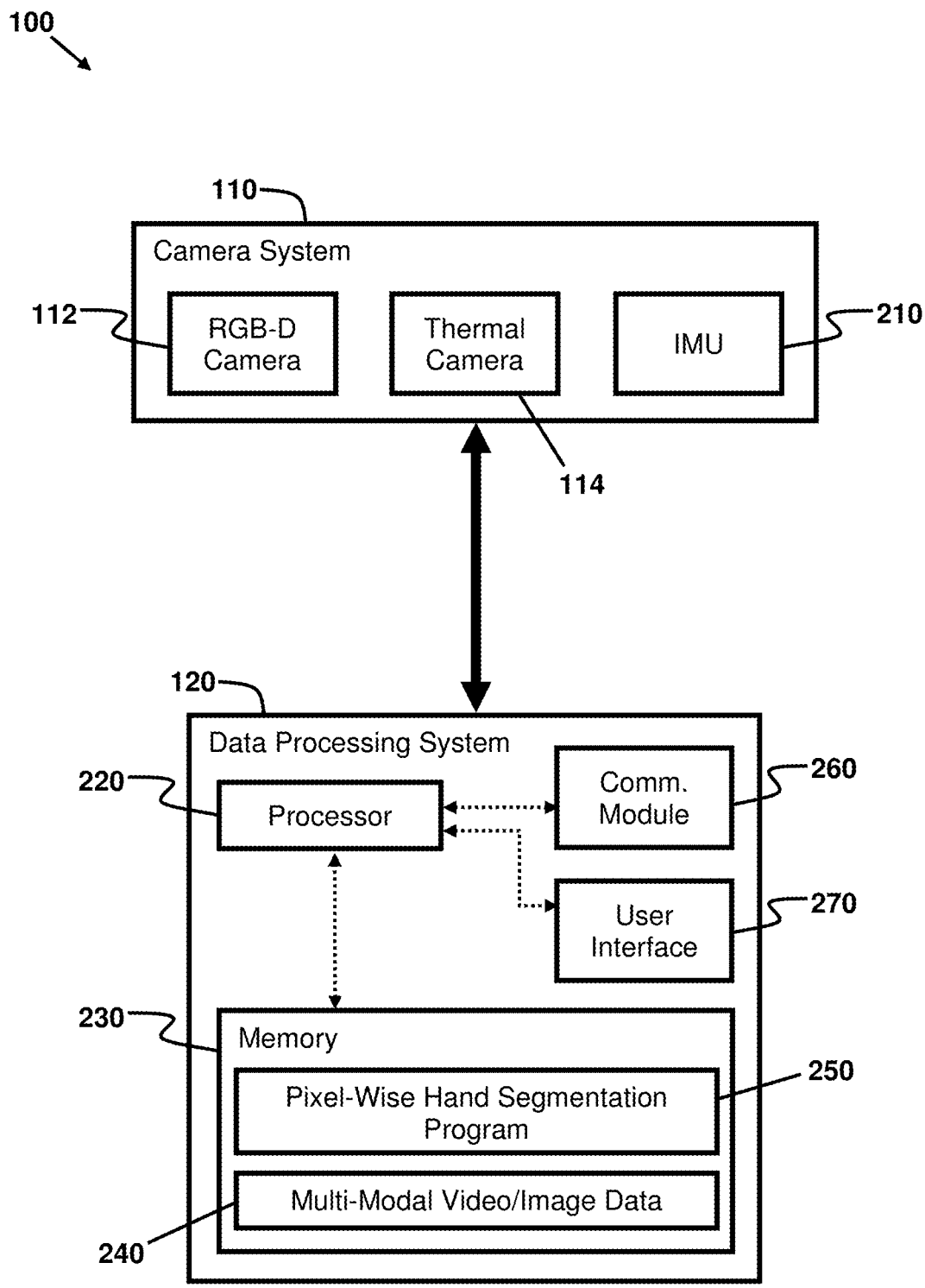
FIG. 2 shows exemplary components of the camera system and the data processing system of FIG. 1A.

FIG. 2 shows exemplary components of the camera system 110 and the data processing system 120 of the system 100. It will be appreciated that the components of the camera system 110 and the data processing system 120 shown and described are merely exemplary and that the camera system 110 and the data processing system 120 may comprise any alternative configuration.

In the illustrated embodiment, the camera system 110 includes the RGB-D camera 112, the thermal camera 114, and an inertial measurement unit (IMU) 210. Thus, the video/image data captured by the camera system 110 includes multi-modal or multi-spectral video/image data, including photographic (RGB) images, depth images, thermal images, and inertial data.

The RGB-D camera 112 (e.g., Intel® D435i) includes at least one photographic (RGB) image sensor configured to generate photographic (RGB) image frames, each of which comprises a two-dimensional array of pixels. Each pixel of the photographic (RGB) image frames has corresponding photometric information (intensity, color, and/or brightness). Additionally, in at least one embodiment, the RGB-D camera 112 includes at least one depth sensor (e.g., an infrared depth sensor) configured to generate depth image frames, each of which comprises a two-dimensional array of pixels. Each pixel of the depth image frames has corresponding geometric information (e.g., a depth or distance value). In one embodiment, the RGB-D camera 112 is configured to automatically align the photographic (RGB) data with the depth data to generate combined RGB-D image frames in which each pixel has both photometric information (e.g., one or more intensity, color, and/or brightness values) and geometric information (e.g., a depth or distance value). It will be appreciated by those of ordinary skill in the art that the RGB-D camera 112 may, alternatively, take the form of two photographic (RGB) image sensors configured to capture stereoscopic images and a processor configured to derive the depth information from stereoscopic images, thus obviating the need for an actual depth sensor. Additionally, the RGB-D camera 112 may of course, alternatively comprise a discreet photographic (RGB) camera and a discreet depth camera.

The thermal camera 114 (e.g., Flir® Boson® 320) includes at least one thermal sensor, in particular a longwave infrared sensor, configured to generate thermal (LWIR) image frames, each of which comprises a two-dimensional array of pixels. Each pixel of the thermal (LWIR) image frames has corresponding thermal information (temperature and/or thermal radiation). The thermal camera 114 may comprise a non-radiometric thermal camera or a radiometric thermal camera.

The IMU 210 includes one or more gyroscope sensors and one or more accelerometers. In one embodiment, the IMU 210 comprises an integrated 6-axis inertial sensor that provides both triaxial acceleration measurements and triaxial gyroscopic measurements. In at least one embodiment, the IMU 210 is integrated with the RGB-D camera 112.

With continued reference to FIG. 2, the data processing system 120 comprises a processor 220 and a memory 230. The processor 220 is configured to execute instructions to operate the system 100 to enable the features, functionality, characteristics and/or the like as described herein. Thus, it will be recognized by those of ordinary skill in the art that a "processor" includes any hardware system, hardware mechanism or hardware component that processes data, signals or other information. The processor 220 may include a system with a central processing unit, graphics processing units, multiple processing units, dedicated circuitry for achieving functionality, programmable logic, or other processing systems.

In at least one embodiment, the processor 220 is communicatively connected to the camera system 110 so as to receive multi-modal video/image data 240 from the camera system 110, such as via a USB controller or similar (not shown) configured to communicate with the camera system 110. In alternative embodiments, the processor 220 may receive the multi-modal video/image data 240 indirectly by some other means, such as download over the Internet or by a removable computer readable medium.

The memory 230 is configured to store data and program instructions that, when executed by the processor 220, enable the system 100 to perform various operations described herein. The memory 230 at least stores instructions including a pixel-wise hand segmentation program 250 for execution by the processor 220, as well as the multi-modal video/image data 240 for use by the pixel-wise hand segmentation program 250. The memory 230 may be of any type of device capable of storing information accessible by the processor 220, such as a memory card, ROM, RAM, hard drives, discs, flash memory, or any of various other computer-readable medium serving as data storage devices, as will be recognized by those of ordinary skill in the art.

The network communication module 260 of the data processing system 120 provides an interface that allows for communication with any of various devices using various means. In particular, the network communication module 260 may include a local area network port that allows for communication with any of various local computers housed in the same or nearby facility. In some embodiments, the network communications module 260 further includes a wide area network port that allows for communications with remote computers over the Internet. Alternatively, the data processing system 120 communicates with the Internet via a separate modem and/or router of the local area network. In one embodiment, the network communications module is equipped with a Wi-Fi transceiver or other wireless communications device. Accordingly, it will be appreciated that communications with the data processing system 260 may occur via wired communications or via the wireless communications. Communications may be accomplished using any of various known communications protocols.

The data processing system 120 may be operated locally or remotely by a user. To facilitate local operation, the data processing system 120 may include an interactive user interface 270. Via the user interface 270, a user may cause the instructions, including the pixel-wise hand segmentation program 250, to be executed and may collect data from and store data to the memory 230. In at least one embodiment, the user interface 270 may suitably include an LCD display screen or the like, a mouse or other pointing device, a keyboard or other keypad, speakers, and a microphone, as will be recognized by those of ordinary skill in the art. Alternatively, in some embodiments, a user may operate the system 100 remotely from another computing device which is in communication therewith via the network communication module 260 and has an analogous user interface.

Generating a Multi-Modal Video Dataset Having Pixel-Wise Hand Segmentation

Figure 3:
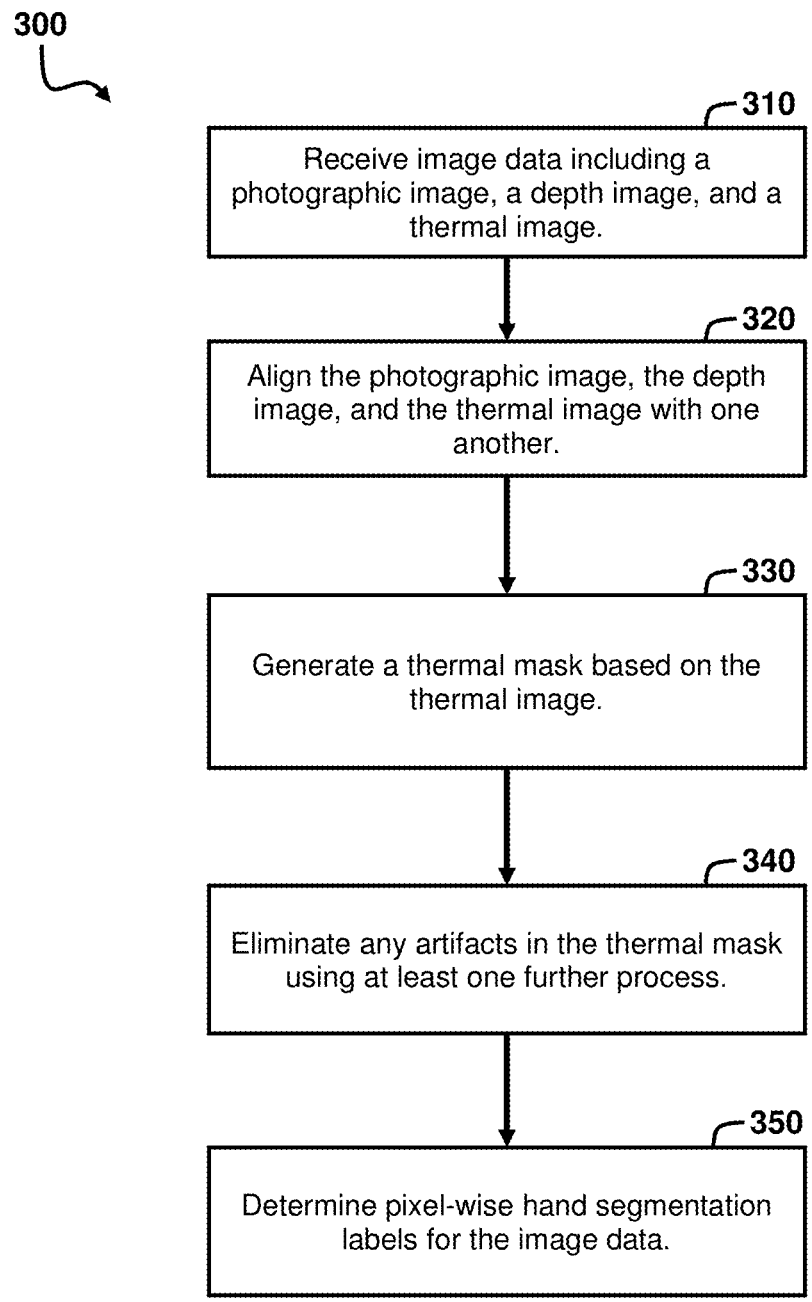
FIG. 3 shows a flow diagram for a method for generating a multi-modal video dataset having pixel-wise hand segmentation labels.

FIG. 3 shows a flow diagram for a method 300 for operating the system 100 to generate a multi-modal video dataset having pixel-wise hand segmentation labels. The method 300 advantageously captures a multi-modal video dataset of hand activity and utilizes both spatial and thermal features to segment the hands from the background and from the objects or tools that are interacted with. As a result, the method 300 is robust and effective even when parts of the hands are occluded and, unlike some conventional methods, the method 300 does not require hand pose labels or a hand mesh model. In this way, the method 300 is more efficient than the traditional pixel-wise labeling tasks while maintaining a high performance. Moreover, the method 300 is more accurate because it enables annotation of smoother curves compared to conventional polygon drawing methods. Finally, the resulting multi-modal hand activity video dataset is advantageous for training more robust and accurate models for a variety of computer vision tasks.

In the description of the method 300, statements that the method and/or system is performing some task or function generally refers to a controller or processor (e.g., the processor 220 of the data processing system 120) executing programmed instructions (e.g., the pixel-wise hand segmentation program 250) stored in non-transitory computer readable storage media (e.g., the memory 230 of the data processing system 120) operatively connected to the controller or processor to manipulate data or to operate one or more components in the system 100 to perform the task or function. Additionally, the steps of the methods may be performed in any feasible chronological order, regardless of the order shown in the figures or the order in which the steps are described.

The method 300 begins with receiving image data including a photographic image, a depth image, and a thermal image (block 310). Particularly, the processor 220 of the data processing system 120 reads multi-modal image data from the memory 230 (e.g., multi-modal video/image data 240). The multi-modal image data at least includes a photographic (RGB) image, a depth image, and a thermal (LWIR) image, which were captured concurrently with one another, for example by the camera system 110. As noted above, the multi-modal video/image data 240 comprises a plurality of sets of individual photographic (RGB) images, depth images, and thermal images, as well as inertial data of the camera system 110 captured concurrently with the images. Each set of concurrently captured images is processed separately by the processor 220 to provide pixel-wise hand segmentation.

The raw thermal (LWIR) image that was captured by the camera system 110 is denoted $I_{LWIR}^{raw}$ and comprises a two-dimensional array of pixels having predetermined dimensions $H_{LWIR} \times W_{LWIR}$. Each pixel of the thermal (LWIR) image $I_{LWIR}^{raw}$ has corresponding thermal information (temperature and/or thermal radiation). It should be appreciated that the raw thermal (LWIR) image $I_{LWIR}^{raw}$ is generally not yet aligned with concurrently captured photographic image and depth image.

In some embodiments, camera system 110 is configured to capture combined photographic and depth (RGB-D) images. The raw combined photographic and depth (RGB-D) image is denoted $I_{RGB-D}^{raw}$. The photographic and depth (RGB-D) image $I_{RGB-D}$ comprises a two-dimensional array of pixels having dimensions $H_{RGB-D} \times W_{RGB-D}$. Each pixel of the photographic and depth (RGB-D) image $I_{RGB-D}^{raw}$ has corresponding photometric information (intensity, color, and/or brightness) and corresponding geometric information (e.g., a depth or distance value). In the case of combined photographic and depth (RGB-D) images, it should be appreciated that the photometric and geometric information is aligned automatically by the camera system 110 and/or by the RGB-D camera 112 thereof.

In alternative embodiments, camera system 110 is configured to separately capture photographic (RGB) images and depth images. The raw photographic image is denoted $I_{RGB}^{raw}$ and comprises a two-dimensional array of pixels having dimensions $H_{RGB} \times W_{RGB}$. Each pixel of the photographic (RGB) image has corresponding photometric information (intensity, color, and/or brightness). Likewise, the raw depth image is denoted $I_D^{raw}$ and comprises a two-dimensional array of pixels having predetermined dimensions $H_D \times W_D$. Each pixel of the depth image $I_D^{raw}$ has corresponding geometric information (e.g., a depth or distance value). It should be appreciated that the raw photographic image and the raw depth image may or may not be aligned with one another.

The method 300 continues with aligning the photographic image, the depth image, and the thermal image with one another (block 320). Particularly, the processor 220 of the data processing system 120 is configured to align the raw photographic (RGB) image $I_{RGB}^{raw}$, the raw depth image $I_D^{raw}$, and the raw thermal (LWIR) image $I_{LWIR}^{raw}$. To this effect, the processor 220 determines an aligned photographic (RGB) image, denoted $I_{RGB}$, an aligned depth image, denoted $I_D$, and an aligned thermal (LWIR) image, denoted $I_{LWIR}$. Likewise, in the case of combined photographic and depth (RGB-D) images, the processor 220 determines the aligned thermal (LWIR) image $I_{LWIR}$ and an aligned photographic and depth (RGB-D) image, denoted $I_{RGB-D}$.

The aligned photographic (RGB) image $I_{RGB}$, depth image $I_D$, (or combined photographic and depth (RGB-D) image $I_{RGB-D}$) and thermal (LWIR) image $I_{LWIR}$ are, in particular, aligned such that the images appear to have been captured from the same perspective. In this way, the photometric, depth, and thermal information of pixels having the same position in the images all correspond to the same subject matter (i.e. to same location within the scene at the time the images were captured). In some embodiments, the processor 220 is configured to resize the dimensions of the aligned photographic (RGB) image $I_{RGB}$, depth image $I_D$, (or combined photographic and depth (RGB-D) image $I_{RGB-D}$) and thermal (LWIR) image $I_{LWIR}$, such that they have the same dimensions H×W.

In at least one embodiment, the raw photographic (RGB) image $I_{RGB}^{raw}$ or the raw combined photographic and depth (RGB-D) $I_{RGB-D}^{raw}$ provides a baseline or target camera perspective. In this way, the raw photographic (RGB) image $I_{RGB}^{raw}$ is one and the same as aligned photographic (RGB) image $I_{RGB}$. Likewise, in the case of combined photographic and depth (RGB-D) images, the raw photographic and depth (RGB-D) $I_{RGB-D}^{raw}$ is one and the same as the aligned photographic and depth (RGB-D) image $I_{RGB-D}$. Accordingly, the processor 220 is merely configured to determine the aligned thermal (LWIR) image $I_{LWIR}$ and depth image $I_D$. Likewise, in the case of combined photographic and depth (RGB-D) images, the processor 220 is merely configured to determine the aligned thermal (LWIR) image $I_{LWIR}$.

The processor 220 determines the aligned thermal (LWIR) image $I_{LWIR}$ by projecting the raw thermal (LWIR) image $I_{LWIR}^{raw}$ from the LWIR coordinate plane into the RGB coordinate plane. As used herein, the LWIR coordinate plane refers to the coordinate plane of the raw thermal (LWIR) images captured by the thermal camera 114 and the RGB coordinate plane refers to the coordinate plane of the raw photographic (RGB) images captured by RGB-D camera 112 or discreet RGB camera. In order to determine the aligned thermal (LWIR) image $I_{LWIR}$, the processor 220 determines a transformation T that transforms the LWIR coordinate plane into the RGB coordinate plane, i.e. $I_{LWIR}$=T($I_{LWIR}^{raw}$).

In at least one embodiment, the processor 220 is configured to determine the aligned thermal (LWIR) image $I_{LWIR}$ by transforming the raw thermal (LWIR) image $I_{LWIR}^{raw}$ first into the depth coordinate plane and then from the depth coordinate plane into the RGB coordinate plane. As used herein, the depth coordinate plane refers to the coordinate plane of the raw depth images captured by RGB-D camera 112 or discreet depth camera.

To transform the raw thermal (LWIR) image $I_{LWIR}^{raw}$ to the depth coordinate plane, the spatial relationship between the thermal camera 114 and the RGB-D camera 112 or discreet depth sensor must be determined. The spatial relationship between the thermal camera 114 and the depth camera of the RGB-D camera 112 can be defined according to equation (1):

$$P_T = R \cdot P_D + T \qquad (1),$$

where $P_D$ is an object point in depth coordinate plane, $P_T$ is an object point in the LWIR coordinate plane, R is a 3D rotation matrix, and T is a translation matrix. It should be appreciated that, in at least some embodiments, the matrices R and T are constant because the housing/frame 140 holds the thermal camera 114 and the RGB-D camera 112 at a fixed position and orientation relative to one another.

A projection of an object in pixel space is derived by multiplying the camera intrinsic matrix with an object point, which is illustrated by equations (2) and (3):

$$p_D = K_D \cdot P_D \qquad (2),$$

$$\lambda \cdot p_T = K_T \cdot P_T \qquad (3),$$

where $K_T$ is the camera intrinsic matrix for thermal camera 114, $K_D$ is the camera intrinsic matrix for depth camera of the RGB-D camera 112, $p_D = [u_D, v_D, w_D]^T$ is a projected point in the depth coordinate plane, $p_T = [u_T, v_T, 1]^T$ is a projected point in the LWIR coordinate plane, $\lambda$ is a scale factor, and $w_D$ is a depth value in the camera space of the depth camera.

By combining equation (1), (2), and (3), the following equation (4) can be determined:

$$\lambda \cdot p_T = K_T \cdot (R \cdot K_D^{-1} \cdot p_D + T) \qquad (4).$$

The processor 220 is configured to transform the raw thermal (LWIR) image $I_{LWIR}^{raw}$ into the depth coordinate plane by solving the equation (4) with respect to each pixel in the raw thermal (LWIR) image $I_{LWIR}^{raw}$. Next, if necessary, the processor 220 further projects the raw thermal (LWIR) image $I_{LWIR}^{raw}$ from the depth coordinate plane into the RGB coordinate plane. In one embodiment, the raw thermal (LWIR) image $I_{LWIR}^{raw}$ is further projected from the depth coordinate plane into the RGB coordinate plane using an application programming interface (API) of the RGB-D camera 112 (e.g., Intel RealSense API). In one embodiment, the transformation between depth coordinate plane and the RGB coordinate plane is determined the using a key point detection/matching algorithm.

Finally, if necessary, the processor 220 (or the RGB-D camera 112 itself) determines the aligned depth image $I_D$ by projecting the raw depth image $I_D^{raw}$ from the depth coordinate plane into the RGB coordinate plane. In one embodiment, the raw depth image $I_D^{raw}$ is projected from the depth coordinate plane into the RGB coordinate plane using an API of the RGB-D camera 112 (e.g., Intel RealSense API). In one embodiment, the transformation between depth coordinate plane and the RGB coordinate plane is determined the using a key point detection/matching algorithm.

The method 300 continues with generating a thermal mask based on the thermal image (block 330). Particularly, the processor 220 of the data processing system 120 is configured to determine a thermal mask, denoted $I_{TM}$ based on the aligned thermal (LWIR) image $I_{LWIR}$. The thermal mask $I_{TM}$ defines at least one region of the thermal (LWIR) image $I_{LWIR}$ that likely corresponds to the human person and at least one region of the thermal (LWIR) image $I_{LWIR}$ that does not correspond to the human person. The thermal mask $I_{TM}$, more particularly, is a binary mask comprising a two-dimensional array of data corresponding to the pixels of the images. Each datum of the thermal mask $I_{TM}$ consists of a binary class label (e.g., one or zero, true or false) for a corresponding pixel of the images. As will be discussed further below, this thermal mask $I_{TM}$ is used to narrow down the search space for pixels corresponding to hands.

In at least one embodiment, the processor 220 is configured to determine the thermal mask $I_{TM}$ by applying a bounding function $\omega(\ )$ according to equations (5)-(7), which determine which pixels of the thermal (LWIR) image $I_{LWIR}$ are within predetermined temperature bounds for a human hand:

$$I_{TM} = \omega(I_{LWIR}) \qquad (5)$$

$$\omega^{(i,j)}(I_{LWIR}^{(i,j)}) = \begin{cases} 1 & \text{if } a \leq I_{LWIR}^{(i,j)} \leq b \\ 0 & \text{otherwise} \end{cases} \qquad (6)\\(7)$$

where $I_{TM} \in [0,1]^{H \times W}$ $I_{LWIR} \in \mathbb{R}^{H \times W}$, (i,j) are pixel coordinates within the thermal (LWIR) image $I_{LWIR}$, a is a lower temperature bound of hand temperature, and b is an upper temperature bound of hand temperature.

In some embodiments, such as those in which the thermal camera 114 only provides relative temperature measurements, the temperature bounds a and b are manually determined or captured for every sequence of video by a human. The accuracy or appropriateness of the selected temperature bounds can investigated by overlapping the thermal (LWIR) image $I_{LWIR}$ with the depth image $I_D$, and ensuring a correspondence between regions within the temperature bounds and regions of the image depth image $I_D$ corresponding to the hands. Alternatively, in other embodiments such as those in which the thermal camera 114 provides absolute temperature measurements, the temperature bounds a and b are predetermined according to the expected and known temperature ranges for the human body.

In effect, the resulting thermal mask $I_{TM}$ identifies regions of the images that are likely to correspond to hands, and greatly reduces the search space for pixels that should be labeled as corresponding to hands. Advantageously, this thermal thresholding is invariant to colors, textures, and lighting conditions. In other methods, color information may mislead vision systems in distinguishing shape features. The color invariance property of the method 300 improves the quality of labels and efficiency. However, the resulting thermal mask $I_{TM}$ may nevertheless falsely include pixels from the surroundings that share the same temperature. Accordingly, further processing is useful to eliminate any such artifacts from the resulting thermal mask $I_{TM}$.

The method 300 continues with a step of eliminating any artifacts in the thermal mask using at least one further process (block 340). Particularly, the processor 220 of the data processing system 120 is configured to eliminate any artifacts in the thermal mask $I_{TM}$ using one or more further processes. As used herein, artifacts in the thermal mask $I_{TM}$ refer to regions that share a similar temperature to hands, and were thus included within the thermal mask $I_{TM}$, but that do not in fact correspond to hands within the images. These artifacts may, for example, correspond to an object or tool that has been warmed by virtue of being held in the hands. Additionally, in at least some embodiments, the pixel-wise hand segmentation is intended to exclude the forearm of the person and, thus, the forearm may be considered an artifact.

Figure 4:
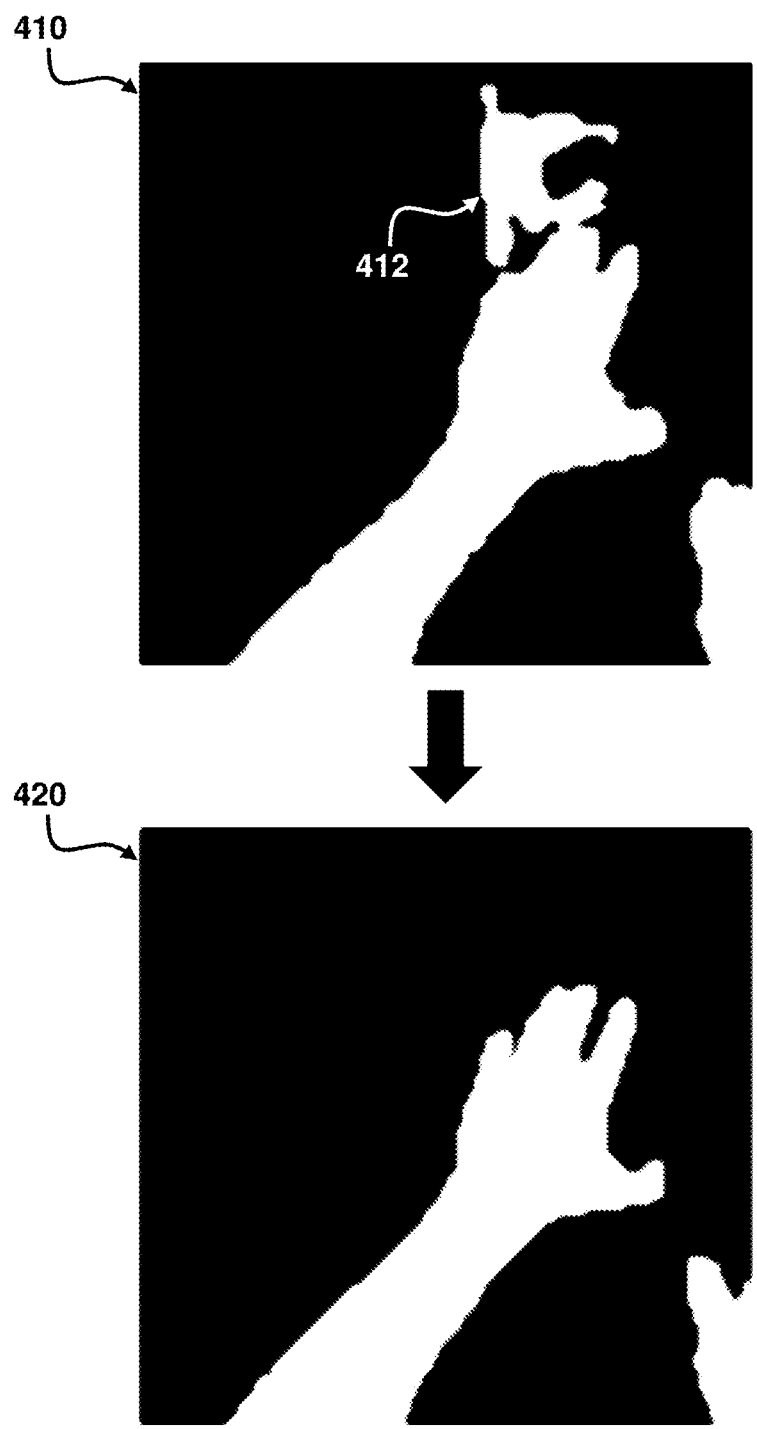
FIG. 4 shows removal of artifacts from an exemplary thermal mask.

In some embodiments, one or more additional processes are utilized to eliminate artifacts by directly refining or modifying the thermal mask $I_{TM}$ itself. FIG. 4 shows an exemplary thermal mask 410 having artifacts 412, which do not actually correspond to hands. Using one or more additional processes, the artifacts 412 are eliminated, resulting in a refined thermal mask 420. Alternatively or in addition, one or more additional processes can be used to generate bounding boxes or further masks, which can be intersected with the initial thermal mask $I_{TM}$ to determine the final pixel-wise hand segmentation labels.

In one embodiment, the processor 220 eliminates artifacts using a tracker algorithm configured to determine locations of the hands within the aligned images. It should be appreciated that the tracker algorithm can take a wide variety of forms and utilize a wide variety of strategies to determine locations of the hands within the aligned images. For example, in some embodiments, the tracker algorithm may take the form of a machine learning model, in particular a deep neural network. In other embodiments, the tracker algorithm may take the form a more conventional rules-based algorithm.

In at least one embodiment, the processor 220 is configured to determine the locations of the hands or locations of the wrists based on at least one of photographic (RGB) image $I_{RGB}$, the thermal (LWIR) image $I_{LWIR}$, and the depth image $I_D$. In one embodiment, the processor 220 removes artifacts of the initial thermal mask $I_{TM}$ based the locations of the hands or locations of the wrists, using one or more geometric constraints (e.g., remove artifacts that are too far away from the locations of the hands or locations of the wrists).

In at least one embodiment, the processor 220 is configured to determine at least one bounded region of the aligned images that that includes the hands of the person based on at least one of photographic (RGB) image $I_{RGB}$, the thermal (LWIR) image $I_{LWIR}$, and the depth image $I_D$. In some embodiments, the at least one bounded region consists of a first bounded region that includes the left hand of the person and a second bounded region that includes the left hand of the person. As discussed in further detail below, the determined locations of the hands and/or the determined at least one bounded region can be used to filter out artifacts from the initial thermal mask $I_{TM}$ to determine the final pixel-wise hand segmentation labels.

In one embodiment, the processor 220 is configured to generate bounding boxes around the hands in the aligned images. Particularly, the processor 220 is configured to determine an Oriented Minimum Bounding Box (OMBB) for each hand in the aligned images. The OMBBs are rectangular or quadrilateral regions in the aligned images that include hands and are oriented so as to minimize an area within the OMBB that does not correspond to the hands. The OMBBs can be defined simply by four points or pixel coordinates in the aligned images.

In one embodiment, the processor 220 determines bounded regions or OMBBs, at least in part, based on one or more previously determined bounded regions or OMBBs of the previous (in time) images. In this way, the processor 220 tracks the movements of the hands in the images over time and updates determined bounded regions or OMBBs based on the current images. In at least one embodiment, bounded regions or OMBBs for an initial image in a sequence of images are received from a human annotator, such as by user inputs received via the user interface 270.

In at least one embodiment, a human annotator validates the bounded regions or OMBBs that are determined for each image. Particularly, the processor 220 is configured to present the bounded regions or OMBBs to a human annotator, such as by displaying on a display screen a visualization of the bounded regions or OMBBs overlaid upon the photographic (RGB) image $I_{RGB}$. If one of the bounded regions or OMBBs is incorrect, the human annotator provides inputs, such as via the user interface 270, indicating a corrected bounded region or OMBB. The processor 220 receives these inputs and corrects previously determined bounded regions or OMBBs based on the user inputs.

Figure 5:
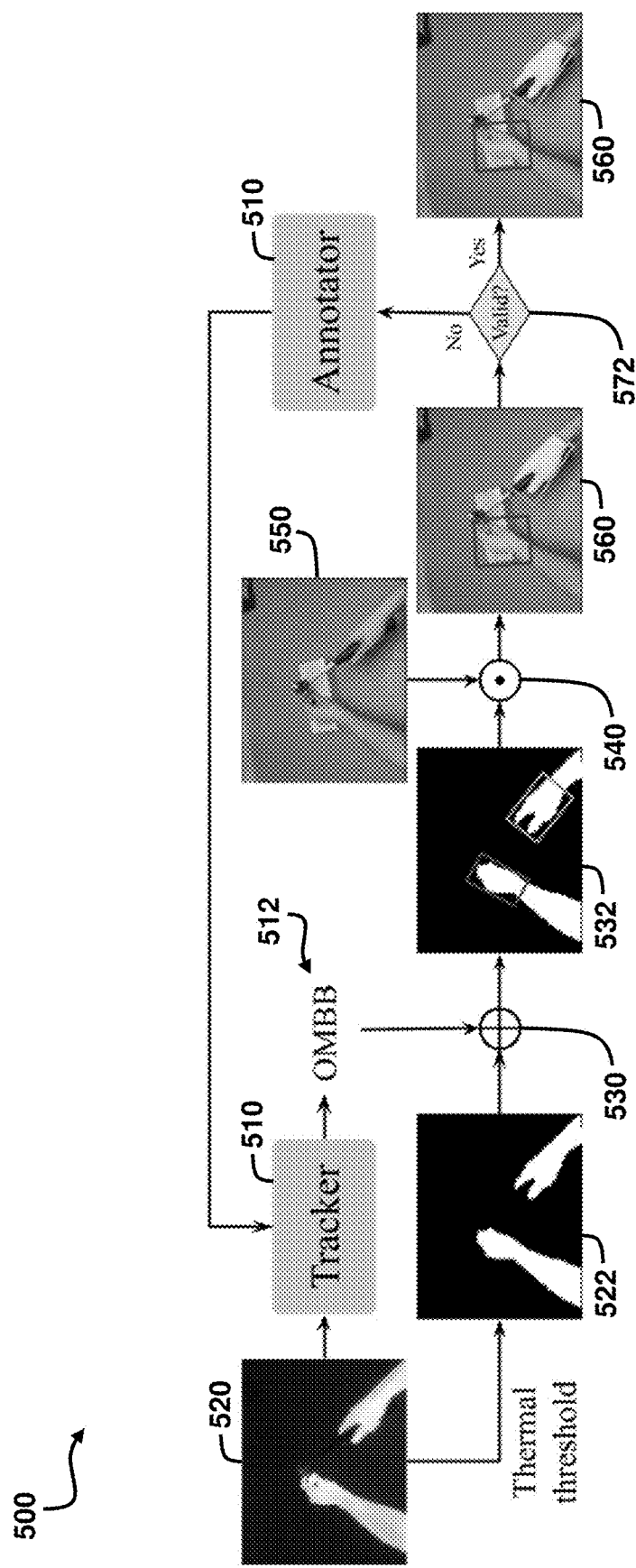
FIG. 5 shows a process that incorporates a tracker algorithm for eliminating artifacts of the thermal mask.

FIG. 5 shows a process 500 that incorporates a tracker algorithm 510 for eliminating artifacts in a thermal mask. Particularly, the processor 220 determines a thermal mask 522 based on a thermal image 520, in the manner discussed above. Additionally, the processor 220 executes the tracker algorithm 510 to determine OMBBs 512 or equivalent bounding regions. The processor 220 intersects 530 the OMBBs 512 with the thermal mask 522 and overlays 540 the intersected result 532 with the photographic image 550 to arrive at a labeling result 560. After each frame of image data is labeled, the processor 220 presents the labeling result 560 to a human annotator 570, such as by displaying on a display screen a visualization of the OMBBs 512 and/or the thermal mask 522 overlaid upon the photographic image 550. The human annotator 570 validates 572 that the OMBBs 512 were determined correctly by the tracker algorithm 510. If the OMBBs 512 were invalid, then the human annotator 570 manually inputs correct OMBBs, which are fed back to the tracker algorithm 510, and the processor 220 corrects the OMBBs based on the correct OMBBs provided by the human annotator 570.

In at least one embodiment, the tracker algorithm used to determine the bounded regions or OMBBs is a machine learning model. In this case, the tracker algorithm must be trained using a corpus of training data including images with bounded regions or OMBBs. These training data can be generated manually or collected using a crowdsourcing platform, such as Amazon Mechanical Turk. In some embodiments, the tracker algorithm may be trained using Axis-Aligned Bounding Boxes (AABBs) which are not oriented and minimized as discussed above with respect to the OMBBs, instead being aligned with the axes of the images.

Returning to FIG. 3, the method 300 continues with determining pixel-wise hand segmentation labels for the image data (block 350). Particularly, the processor 220 of the data processing system 120 is configured to label each respective pixel of the photographic (RGB) image $I_{RGB}$, the thermal (LWIR) image $I_{LWIR}$, and/or the depth image $I_D$ as either a first class indicating that the respective pixel corresponds to the hands of the person or a second class indicating that the respective pixel does not correspond to the hands of the person. In some embodiments, the processor 220 labels each respective pixel as either a first class indicating that the respective pixel corresponds to the left hand of the person, a second class indicating that the respective pixel corresponds to the right hand of the person, or a third class indicating that the respective pixel does not correspond to the hands of the person.

In many embodiments, the pixel-wise hand-segmentation labels take the form of one or more classification masks. Each classification mask is a mask, preferably a binary mask, comprising a two-dimensional array of data corresponding to the pixels of the images. Each datum of the classification masks consists of a class label, preferably a binary class label (e.g., one or zero, true or false), for a corresponding pixel of the images. In one embodiment, the classification masks include a first binary mask that classifies pixels as corresponding to the left hand of the person or not and a second binary mask that classifies pixels as corresponding to the right hand of the person or not.

The processor 220 is configured to determine pixel-wise hand segmentation labels, in particular the classification masks, based on the thermal mask $I_{TM}$ and based on the determined locations of the hands, the bounded regions, and/or the OMBBs. In particular, in at least one embodiment, the processor 220 determines the pixel-wise hand segmentation labels, in particular the classification masks, by determining an intersection of the thermal mask $I_{TM}$ with the determined locations of the hands, the bounded regions, and/or the OMBBs. The processor 220 labels pixels that are within the intersection as the class corresponding to the hands or to the particular classes corresponding to the left hand and to the right hand, respectively. The processor 220 labels pixels that are outside the intersection as the class not corresponding to the hands or to the particular class not corresponding to the left hand and to the right hand, respectively.

Multi-Modal Machine Learning Model

As mentioned before, a multi-modal machine learning model can be trained using the multi-modal video/image data 240 and the pixel-wise hand segmentation labels determined using the method 300. As used herein "multi-modal machine learning model" refers to a machine learning model that takes, as input, data of two or more types (e.g., photographic images, depth images, thermal images, and/or inertial data). As used herein, the term "machine learning model" refers to a system or set of program instructions and/or data configured to implement an algorithm, process, or mathematical model that predicts and provides a desired output based on a given input. Exemplary machine learning models include convolutional neural networks, recurrent neural networks, support vector machines, and the like. It will be appreciated that parameters of a machine learning model are not explicitly programmed and the machine learning model is not, in the traditional sense, explicitly designed to follow particular rules in order to provide the desired output for a given input. Instead, the model is provided with a corpus of training data from which identifies or "learns" patterns and statistical relationships or structures in the data, which are generalized to make predictions with respect to new data inputs. In the case of neural networks, the results of the training process are embodied by a plurality of learned parameters, kernel weights, and/or filter values that are used in the various layers of the neural networks to perform various operations or functions.

In the most basic example, the multi-modal machine learning model can be configured to perform pixel-wise hand segmentation, i.e. the same operation as performed by the method 300. It should be appreciated, of course, that a machine learning model that is trained in this manner advantageously eliminates the any need for human annotators in the loop. Moreover, a machine learning model that is trained in this manner may provide a more accurate or faster (e.g., real-time) solution for pixel-wise hand segmentation that may not be achievable using the method 300. Thus, in many applications, a multi-modal machine learning model configured to perform pixel-wise hand segmentation may have several advantages that are not provided by the method 300. However, a large labeled dataset, such as one generated using the method 300 is requisite to utilizing such a multi-modal machine learning model.

The multi-modal machine learning model can be executed by a data processing system, similar to the data processing system 120, to perform pixel-wise hand segmentation. Particularly, the data processing system may receive photographic, depth, and thermal images and execute program instructions of the multi-modal machine learning model with the photographic, depth, and thermal images as inputs to generate hand segmentation labels and/or a classification mask, similar to those discussed above.

Additionally, a multi-modal machine learning model that is configured for more complex computer vision tasks such as hand tracking, hand pose estimation, grasp detection, hand gesture recognition, multi-view prediction, and hand-action classification can be similarly trained at least in part using the pixel-wise hand segmentation labels determined using the method 300.

Figure 6:
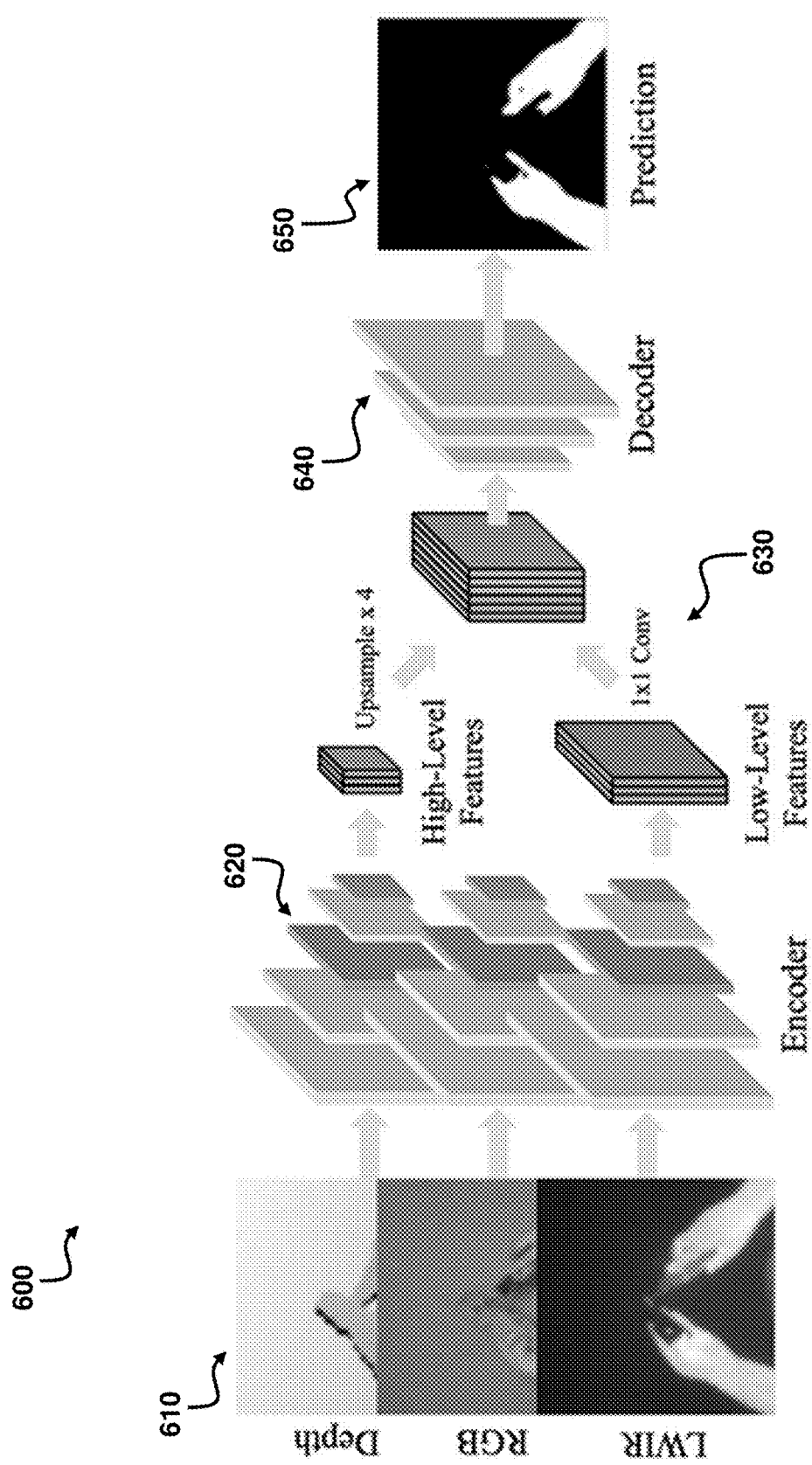
FIG. 6 shows an exemplary multi-modal machine learning model configured to perform pixel-wise hand segmentation.

FIG. 6 shows an exemplary multi-modal machine learning model 600 configured to perform pixel-wise hand segmentation. The multi-modal machine learning model 600 takes the form of a convolutional neural network having a plurality of convolution layers. It will be appreciated by those of ordinary skill in the art that a convolutional neural networks (CNNs) are a type of feed-forward neural network that contains a number of convolution layers or convolution operations. A convolution layer receives an input, and applies one or more convolutional filters to the input. Each convolutional filter, also referred to as a kernel, is a matrix of weights, also referred to as parameters or filter values, which is applied to various chunks of an input matrix in a defined manner such that the matrix of weights is convolved over the input matrix to provide an output matrix. Values for the matrix of weights are learned in a training process prior to operation of the CNN. The dimensions of the output matrix is determined by the kernel size of the filter (i.e., the size of the matrix of weights) and by the "stride" of the filter, which indicates how much the chunks of the input matrix overlap with one another or are spaced apart from one another during convolution. The various layers and filters of a CNN are used to detect or encode various "features" of the input.

The multi-modal machine learning model 600 is configured to receive multi-modal input data 610 including a photographic (RGB) image, a depth image, and a thermal (LWIR) image. In the illustrated embodiment, the multi-modal machine learning model 600 has an encoder-decoder structure. An encoder portion 620 of the multi-modal machine learning model 600 comprises a sequence of convolution layers that reduce the dimensionality of the multi-modal input data 610 to extract a plurality of high-level features and a plurality of low-level features. In at least one embodiment, the convolution layers of the encoder portion 620 employ atrous (or dilated) convolution to extract the features at an arbitrary resolution. A middle portion 630 of the multi-modal machine learning model 600 up-samples×4 (e.g., bilinear) the high-level features, applies a 1×1 convolution to the low-level features, and concatenates the up-sampled high-level features with the convolved low-level features. Finally, a decoder portion 640 of the multi-modal machine learning model 600 applies a sequence of convolution layers and up-sampling operations to increase the dimensionality of the data and arrive at a prediction of pixel-wise hand segmentation labels, in the form of a classification mask 650. It should be appreciated that the multi-modal machine learning model 600 is merely one exemplary neural network configured to perform hand segmentation based on multi-modal input data.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for pixel-wise hand segmentation of image data, the method comprising:
  receiving, with a processor, image data including a photographic image and a thermal image of a scene including hands of a person in an environment, the photographic image and the thermal image having been captured concurrently by a camera system;
  determining, with the processor, a first binary mask based on the thermal image, the first binary mask defining a first portion of the thermal image estimated to correspond to the person and a second portion of the thermal image estimated to not correspond to the person; and
  labeling, with the processor, each respective pixel of the photographic image as one of at least one first class and a second class based on the first binary mask, the at least one first class indicating that the respective pixel corresponds to the hands of the person, the second class indicating that the respective pixel does not correspond to the hands of the person, the labeling including generating, with the processor, at least one second binary mask based on the first binary mask, the at least one second binary mask classifying a first portion of the photographic image as corresponding to the hands of the person and a second portion of the photographic image as not corresponding to the hands of the person.

2. The method of claim 1 further comprising:
  aligning, with the processor, the photographic image and the thermal image with one another.

3. The method of claim 2, wherein the image data further includes a depth image of the scene, the photographic image, the depth image, and the thermal image having been captured concurrently by the camera system, the aligning further comprising:
  aligning, with the processor, the photographic image and the thermal image with one another based on the depth image.

4. The method of claim 1, the determining the first binary mask further comprising:
  determining the first binary mask by comparing temperature values of pixels of the thermal image with a predetermined range of temperature values, the first portion of the first binary mask corresponding to pixels of the thermal image having temperature values within predetermined range of temperature values, the second portion of the first binary mask corresponding to pixels of the thermal image having temperature values outside the predetermined range of temperature values.

5. The method of claim 1 further comprising:
  determining, with the processor, locations of the hands of the person in the photographic image based on at least one of the photographic image and the thermal image,
  wherein the labeling further comprises labeling each respective pixel of the photographic image as one of at least one first class and the second class based on the locations of the hands and the first binary mask.

6. The method of claim 5, determining the locations of the hands further comprising:
  determining, with the processor, at least one bounded region of photographic image that includes the hands of the person based on at least one of the photographic image and the thermal image,
  wherein the labeling further comprises labeling each respective pixel of the photographic image as one of at least one first class and the second class based on the least one bounded region and the first binary mask.

7. The method of claim 6, the labeling further comprising:
  determining, with the processor, an intersection of the least one bounded region and the first binary mask;
  labeling, with the processor, pixels of the photographic image that are within the intersection of the least one bounded region and the first binary mask as the at least one first class; and
  labeling, with the processor, pixels of the photographic image that are outside the intersection of the least one bounded region and the first binary mask as the second class.

8. The method of claim 6, wherein the least one bounded region includes (i) a first bounded region of the photographic image that includes a left hand of the person and (ii) a second bounded region of the photographic image that includes a right hand of the person.

9. The method of claim 8, wherein (i) the first bounded region is a first quadrilateral region of photographic image that includes the left hand of the person and (ii) the second bounded region is a second quadrilateral region of photographic image that includes the left hand of the person.

10. The method of claim 9, wherein (i) the first quadrilateral region is oriented and sized so as to minimize an area within the first quadrilateral region that does not correspond to the left hand and (ii) the second quadrilateral region is oriented and sized so as to minimize an area within the second quadrilateral region that does not correspond to the right hand.

11. The method of claim 6, the determining the at least one bounded region further comprising:
  determining the at least one bounded region using a machine learning model.

12. The method of claim 6, the determining the at least one bounded region further comprising:
  determining the at least one bounded region of photographic image based on at least one previously determined bounded region of a previously labeled photographic image.

13. The method of claim 6, the determining the at least one bounded region further comprising:
  receiving, via a user interface, user inputs indicating at least one corrected bounded region of the photographic image; and
  correcting, with the processor, the at least one bounded region of the photographic image based on the user inputs.

14. The method of claim 1, wherein the photographic image and the thermal image are captured from a first-person perspective of the person.

15. The method of claim 1, wherein the photographic image and the thermal image include hands of the person interacting at least one object in the environment.

16. The method of claim 1 further comprising:
  training, with the processor, a machine learning model using the labeled pixels of the photographic image as a target,
  wherein the machine learning model is configured to receive new photographic images and thermal images and label pixels the new photographic images as one of the at least one first class and the second class.

17. A non-transitory computer-readable medium for pixel-wise hand segmentation of image data, the computer-readable medium storing program instructions that, when executed by a processor, cause the processor to:
  read, from a memory, image data including a photographic image and a thermal image of a scene including hands of a person in an environment, the photographic image and the thermal image having been captured concurrently by a camera system;

determine a first binary mask based on the thermal image, the first binary mask defining a first portion of the thermal image estimated to correspond to the person and a second portion of the thermal image estimated to not correspond to the person;

determine locations of the hands of the person in the photographic image by determining at least one bounded region of photographic image that includes the hands of the person based on at least one of the photographic image and the thermal image;

determine an intersection of the least one bounded region and the first binary mask; and label each respective pixel of the photographic image as one of at least one first class and a second class based on the intersection of the at least one bounded region and the first binary mask, the at least one first class indicating that the respective pixel corresponds to the hands of the person, pixels of the photographic image that are within the intersection of the least one bounded region and the first binary mask being labeled as the at least one first class, the second class indicating that the respective pixel does not correspond to the hands of the person, pixels of the photographic image that are outside the intersection of the least one bounded region and the first binary mask being labeled as the second class.

18. A method for pixel-wise hand segmentation of image data, the method comprising:

receiving, with a processor, image data including a photographic image and a thermal image of a scene including hands of a person in an environment, the photographic image and the thermal image having been captured concurrently by a camera system;

determining, with the processor, a first binary mask based on the thermal image, the first binary mask defining a first portion of the thermal image estimated to correspond to the person and a second portion of the thermal image estimated to not correspond to the person; and labeling, with the processor, each respective pixel of the photographic image as one of at least one first class and a second class based on the first binary mask, the at least one first class indicating that the respective pixel corresponds to the hands of the person, the second class indicating that the respective pixel does not correspond to the hands of the person, the labeling including:

generating, with the processor, a second binary mask based on the first binary mask, the second binary mask classifying a first portion of the photographic image as corresponding to a left hand of the person and a second portion of the photographic image as not corresponding to the left hand of the person; and generating, with the processor, a third binary mask based on the first binary mask, the third binary mask classifying a third portion of the photographic image as corresponding to a right hand of the person and a fourth portion of the photographic image as not corresponding to the right hand of the person.

* * * * *